Feb. 5, 1963 F. M. GOETZ 3,076,601

ELECTRONIC BINARY COUNTER AND CONVERTER

Filed Aug. 27, 1959 4 Sheets-Sheet 1

INVENTOR
F. M. GOETZ
BY [signature]
ATTORNEY

Feb. 5, 1963 F. M. GOETZ 3,076,601

ELECTRONIC BINARY COUNTER AND CONVERTER

Filed Aug. 27, 1959 4 Sheets-Sheet 2

INVENTOR
F. M. GOETZ
BY
ATTORNEY

Feb. 5, 1963 F. M. GOETZ 3,076,601

ELECTRONIC BINARY COUNTER AND CONVERTER

Filed Aug. 27, 1959 4 Sheets-Sheet 3

INVENTOR
F. M. GOETZ
BY
ATTORNEY

INVENTOR
F. M. GOETZ
BY [signature]
ATTORNEY

United States Patent Office 3,076,601

Patented Feb. 5, 1963

3,076,601

ELECTRONIC BINARY COUNTER AND CONVERTER

Frank M. Goetz, Franklin Square, N.Y., assignor to Bell Telephone Laboratories, Incorporated, New York, N.Y., a corporation of New York Filed Aug. 27, 1959, Ser. No. 836,411
5 Claims. (Cl. 235—92)

This invention relates to electronic counter and converter circuits and more particularly to converter circuits employing reflected binary code electronic counter circuits.

Generally, electronic counter circuits may be considered as falling into one of two specific classes. Into the first of such classes fall those counter circuits wherein the constituent memory units are tandemly arranged or cascaded whereby each memory unit employed therein is connected to the preceding or next lowest order memory unit and adapted to transfer its present count condition whenever the preceding memory unit is transferred from a storage state to a non-storage state. To operate such counters, input pulses are directly applied to the input of the memory unit of lowest order magnitude. Into the second of such classes fall those counter circuits wherein the constituent memory units are not tandemly arranged but are rather multipled through individually associated steering or gating circuits to a single input lead along which input pulses are directed. An example of a counter circuit of the second class is shown in the C. E. Nelson Patent 2,816,223, issued on September 10, 1957. In counter circuits of the second class, an advance to the next count position in a proper counting sequence is affected by an input pulse directed through a predetermined one of the steering or gating circuits which is responsive to be selectively enabled by a particular count position, i.e., the count condition of each memory unit at the time the input pulse is applied. Accordingly, resultant changes to successive count positions by such counter circuits are caused by the appearance of a series of input pulses which are each selectively directed through the steering circuits for the setting or the resetting of selected ones of the memory units according to a predetermined counting sequence.

Counter devices in each of the above-defined first and second classes are required to advance to a next count position upon the application thereto of each input pulse, the count position, i.e., the count conditions of the constituent memory units collectively considered, being indicative of the number of input pulses so received. However, an input pulse still present on the single input lead upon the counter circuit having been advanced to a next count position thereby is directable through steering circuits now enabled by such next count position to initiate an additional advance of the counter circuit to a next subsequent count position.

To assure only a single advance to a next count position by the counter circuit in response to each input pulse, present day counter circuits depend upon delay circuitry, either inherent in the memory units or externally added, and a careful control of input pulse duration. Accordingly, marginal requirements are imposed upon the duration of the input pulses which may be employed with counter devices falling into both the above-defined first and second classes. These requirements are: (1) the input pulse must be of such duration as to assure a transfer of the count condition (as indicated by the output voltage conditions) of the slowest acting memory unit contained in the counter circuit; (2) the input pulse duration must not exceed the round trip propagation time of the shortest feedback loop if binary counter circuits are employed as the constituent memory units; and (3) the time required to operate the slowest acting memory unit contained in the counter circuit must be less than the minimum time to effect a transfer in the count condition of the fastest acting memory unit.

Accordingly, present day counter circuits of high speed application require a careful control of input pulse duration in addition to a careful design of the circuitry comprising each memory unit to effect a standardization of the transfer time of each memory unit by the inclusion of feedback delay therein. However, a controlling of the duration of the information input pulse to meet the above-enumerated requirements is not easily affected. Moreover, delay circuitry cannot be easily included in the feedback loop due to the nonuniformity of operating characteristics of the memory units proper and the rapidly changing impedance levels present within the feedback loop upon a transfer of count condition by the individual memory units. Such control may represent a substantial portion of the cost of the counter circuit in addition to serious restrictions upon the physical layout thereof.

An object of this invention is to provide a binary code counter circuit which can operate reliably independent of variations in input pulse duration and relative transfer times of the memory units therein employed.

Another object of this invention is to provide a reflected binary code counter circuit free of delay circuitry.

Still another object of this invention is to provide a binary code counter circuit adapted to provide a delay-free means for operating a serial-to-parallel converter.

A further object of this invention is to provide a binary code counter circuit of a noncascaded type wherein the number of steering circuits to provide for a large capacity count may be held to a substantial minimum.

A still further object of this invention is to provide a reflected binary code counter, free of delay circuitry, which generates a sequence of pulses on a plurality of output directing leads.

These and other objects are achieved in an illustrative embodiment of this invention by the substitution of logic in place of delay circuitry in a counter circuit of the noncascaded type to affect an independence of the operation thereof upon input pulse duration and the relative transfer time of the memory units therein employed. Such logic is achieved and delay circuitry effectively eliminated by providing that the input pulses be directed alternately and in time sequence along a pair of input leads to the counter circuit, each pulse being operative to advance the count position thereof according to a reflected binary or "Gray-type" code. Accordingly, a feature of this invention relates to the provision of a pair of input leads so adapted with respect to a source of pulses that such pulses are alternately directed therealong to a counter circuit which is responsive to each pulse to advance in a predetermined counting sequence.

In counter circuits wherein binary counters are employed as memory units, a race problem is inherently present as such units may be both transferred to a count condition and retransferred to the original count condition from which it was transferred if the information input pulse duration is not carefully controlled. This race condition arises as binary counters are responsive to be either "set" or "reset" depending upon the present count condition thereof by a pulse directed thereto over a single lead. However, this race problem is effectively avoided by another feature of this invention whereby steering or gating means connected to the pair of input leads are provided to selectively determine the setting or resetting of each one of the constituent memory units along different input means connected thereto and which are responsive to the count conditions of the remaining memory units but not to the count condition of the individual memory unit to be set or reset. An additional feature of this invention relates to the utilization of multivibrator bistable devices as memory units in a counter circuit, the set terminal and the reset terminal of each memory unit having associated therewith a steering circuit responsive to the count conditions of the remaining memory units whereby an input pulse may be selectively directed thereto.

It is desirable that a transfer of count condition of only one of the constituent memory units be affected by each input pulse to avoid false count conditions within the counter circuit. Accordingly, an effective operation of a counter circuit on a delay-free basis is provided by still another feature of this invention whereby such counter circuit is adapted for a single variable change per input pulse to effect a counting sequence according to a reflected binary code, i.e., no two successive count positions of the counter circuit differ in more than one variable. As a counter circuit adapted for a single variable change per input pulse does not pass through false states in a counting sequence and as such counter circuit incorporates such means whereby each memory unit contained therein is "set" or "reset" in a manner independent of its own present stage, an independence of circuit operation upon information input pulse duration is achieved.

A reflected binary code in accordance with which a delay-free counter circuit, according to this invention, may be advantageously coded and the manner by which such codes may be derived are described in R. L. Carbrey Patent 2,538,615, issued January 16, 1951.

It is evident that in a counting sequence wherein a reflected binary code is employed, the memory unit of lowest order magnitude is changed by alternate ones of the input pulses. Accordingly, an additional feature of this invention relates to the steering or gating means wherein a first plurality of steering circuits which are multiplied to both the memory unit of lowest order magnitude contained in a counter circuit and to one of the pairs of input leads along which input pulses are directed. The first plurality of steering circuits are responsive to the present collective count conditions of the remaining memory units contained in the counter circuit to direct alternate pulses from the single pulse source which appear successively on the one input lead to "set" or "reset" the memory unit of lowest order magnitude.

Still another feature of this invention relates to a second plurality of steering circuits which are selectively connected to each of the remaining memory units and multiplied also to the other of the pair of input leads. Each of the second plurality of steering circuits is operative to direct alternate input pulses from the single pulse source which appear successively on the other input lead to "set" or "reset" a predetermined one of the memory units in the second group to which it is connected in response to the present collective count conditions of the remaining memory units, including that of the memory unit of lowest order magnitude. Accordingly, the appearance of an input pulse along either of the pair of input leads and through a steering circuit conditioned according to the count position of the counter circuit is effective only to transfer the present count condition of that memory unit connected to the enabled steering circuit to provide a next count position of the counter circuit. The next count position thus provided results in the enabling of a steering circuit multiplied to the other of the pair of input leads and connected to another and distinct memory unit. As false states within the counter circuit are avoided by the provision of a single variable change per input pulse, the appearance of an input pulse of prolonged duration through an enabled steering circuit cannot affect but a single transfer of count condition of the memory unit connected thereto.

Accordingly, successive pulses appearing on a single input lead are ineffective to advance the count condition of the binary counter unless the state of the next memory unit to be operated in the normal counting sequence has been previously stepped by an input pulse appearing on the other of the pair of input leads. The counting sequence of the counter circuit according to this invention is thereby controlled by circuit logic afforded thereto by the count position provided by a last-received input pulse along one input lead to enable a preselected one of the steering circuits to direct that input pulse appearing on the other of the pair of input leads to that memory unit which must register a change to produce the next count position. The system logic, however, which enables preselected ones of the steering circuits to direct an input pulse to either "set" or "reset" the individual memory units is adapted as not to be affected by the count condition of the memory unit which must register the change.

Still another feature of a specific embodiment of this invention relates to the provision of a redundant memory unit in the counter circuit to reduce the number and complexity of the steering circuits necessary for providing a large capacity counter circuit in accordance with this invention. This redundant effect of a memory unit is achieved by essentially providing that the counter circuit be divided into a first counter section and a second counter section tandemly arranged therewith. The utilization of a redundant memory unit, i.e., the memory unit of highest order magnitude of the first counter section, as a source of input pulses for the second counter section operates to direct count position information of the first counter section to the second counter section as a series of pulses which appear alternately on each of a pair of connecting leads. As a steering circuit device is required for each count position in the operational cycle of the counter circuit, the utilization of a redundant memory unit to provide the first and the second counter sections within the counter circuit results in a substantial decrease in the complexity and in the required number of steering circuit devices when a large capacity count is desired. The redundant memory unit so employed does not add to the capacity of the memory circuit but, rather, is included as part of the circuit logic. As the count condition of the memory unit of lowest order magnitude in the second counter section is transferred concurrently with each transfer of the redundant memory unit, the count condition of the redundant memory unit is not considered as part of the count position of the counter circuit. Necessary control of the steering circuits associated with each counter section is derived from the memory units therein contained. Therefore, by employing a redundant memory unit, the steering circuits become simplified as they now depend only upon the number of count conditions of the individual counter sections and not upon the total number of count conditions of the counter circuit.

A further feature of another specific embodiment of this invention relates to the provision of a converter circuit, either serial-to-parallel or parallel-to-serial, so arranged in combination with the counter circuit of this invention as to be provided with a delay-free operation. The storage circuits comprising the converter circuit are identified one with each count position of the counter circuit. Each storage circuit is selectively connected through appropriate gating circuits to that steering circuit operative to advance the counter circuit to that count position with which it is identified. The gating circuits comprising the serial-to-parallel converter circuit are multipled to a source of serially arranged information pulses. The information pulses and input pulses are concurrently directed to the converter circuit and the counting circuit, respectively, the input pulses being directed by the first and second plurality of steering circuits to successively condition selected ones of the gating circuits whereby each information pulse is applied in proper time sequence to appropriate storage circuits in the former. Accordingly, each input pulse which is directed through the enabled one of the steering circuits to transfer the count condition on a particular memory unit is also operative to condition a predetermined one of the gating circuits whereby an information pulse, if present, is directed to an appropriate storage circuit in time sequence. Upon the binary word having been read into the serial-to-parallel converter circuit, each storage circuit therein contained is simultaneously read whereby the information pulses stored as information bits in each of the storage circuits are parallelly directed to appropriate utilization circuit means. However, the gating circuits comprising the parallel-to-serial converter circuit are multipled to a serial recording arrangement. The information bits parallelly stored in the storage circuits affect a conditioning of selected ones of the gating circuits associated therewith. Each input pulse directed through the enabled one of the steering circuits is operative to successively sample in turn each storage circuit by providing an enabling of the previously-conditioned gating circuits.

The invention will be more fully understood and other objects and features will become apparent from the following detailed description taken in conjunction with the appended drawing, wherein.

Figure 1:
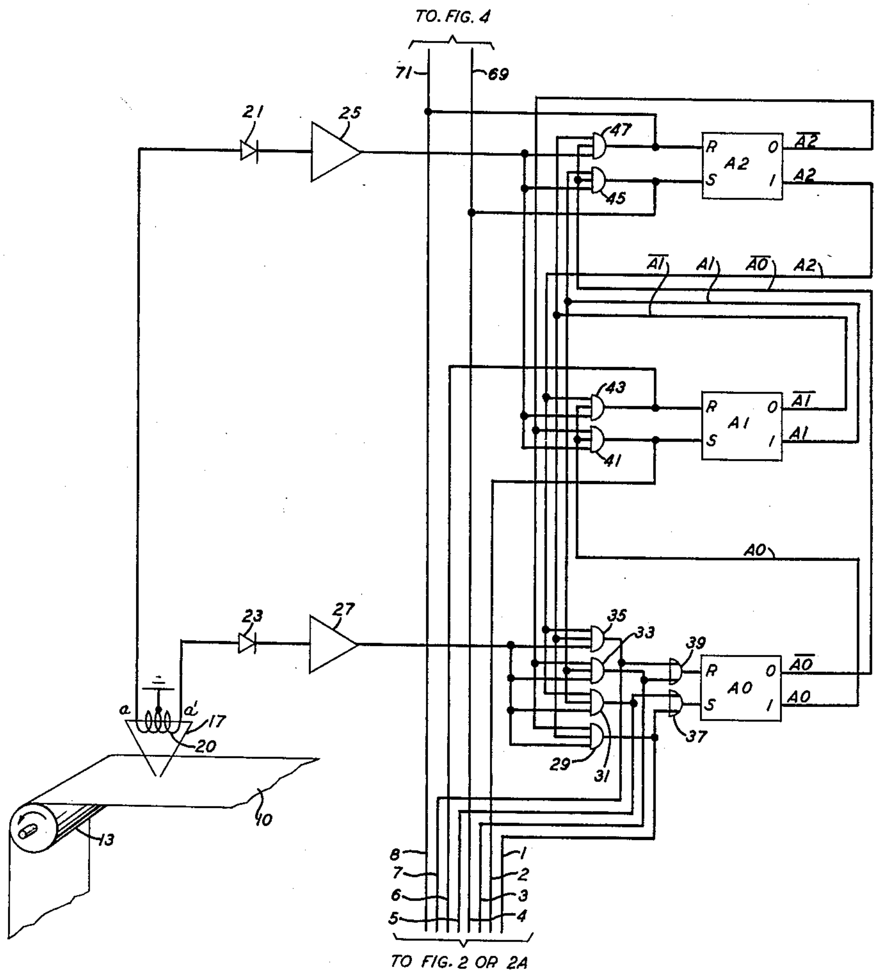
FIG. 1 is a schematic block representation of a delay-free reflected binary code counter circuit in accordance with this invention.
Figure 3:
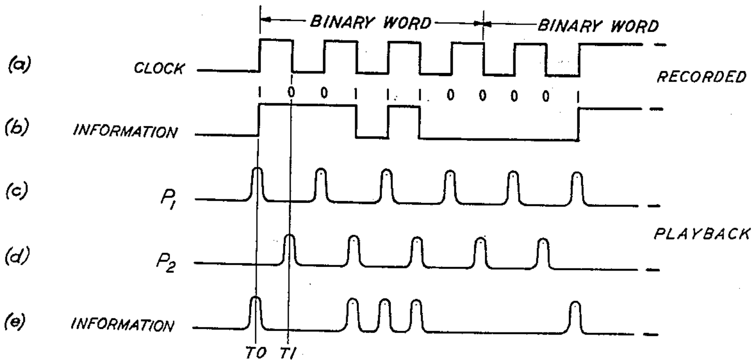
Figure 5:
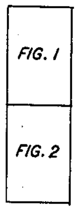
Figure 4:
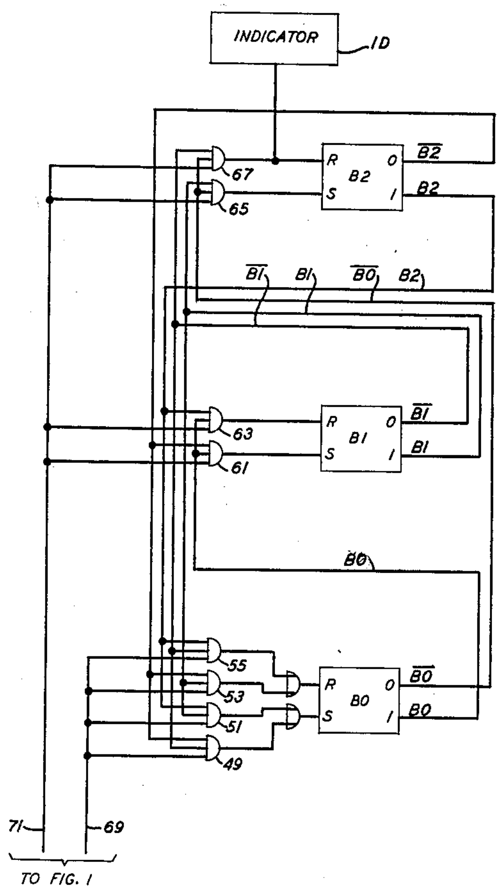
Figure 5A:
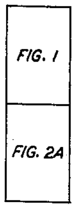
Figure 5B:
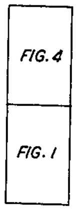

FIG. 3 is a family of wave form diagrams which are of assistance in connection with the explanation of the operation of the counter circuit of FIG. 1; and FIG. 4 is a schematic block representation of a second section of counter circuits in accordance with this invention and which may be connected to the circuit of FIG. 1 in accordance with the key diagram of FIG. 5B to define a different embodiment of my invention.

The illustrative embodiments of my invention shown in schematic block representation in FIGS. 1, 2, 2A and 4 utilize various electronic circuits commonly known in the art. For example, the memory units A0, A1 and A2 comprising a counter circuit or section as shown in FIG. 1 and the memory units B0, B1 and B2 comprising a second counter section of the counter circuit illustrated by FIGS. 1 and 4 together may comprise conventional type multivibrator bistable devices commonly known in the art. Such multivibrator bistable devices may be either of a gas tube or transistor variety provided with a set and a reset input terminal and a detailed description thereof is not deemed necessary. Further, the storage devices C1 through C8 comprising the serial-to-parallel converter circuit of FIG. 2 and the parallel-to-serial converter circuit of FIG. 2A may also comprise multivibrator bistable devices of a conventional type for providing the storage function. It is further noted that conventional symbolism is employed in FIGS. 1, 2, 2A and 4 to designate additional circuits of conventional types, for example, OR gate circuits, AND gate circuits, and amplifier devices, for which a detailed description is not deemed necessary.

The illustrative embodiments of this invention herein described may be conveniently considered as consisting of three portions, namely: a reflected binary code counter circuit comprising one or more counter sections and adapted to provide a convenient source of control pulses; a serial-to-parallel converter circuit or a parallel-to-serial converter circuit which is controlled by the counter circuit, and a source of clock pulses to be directed to the counter circuit as input stepping pulses and redirected from the counter circuit to either converter circuit as control pulses. The cooperative action of the constituent portions of the illustrative embodiments of FIGS. 1 and 2, FIGS. 1 and 2A, and FIGS. 1 and 4 will become more apparent from the detailed description thereof now to be given.

Turning now to FIG. 1, there is depicted a basic binary counter circuit in accordance with my invention and which may be combined, as in the embodiments of FIGS. 1 and 2, FIGS. 1 and 2A, and FIGS. 1 and 4 or in other embodiments, to attain different specified objectives. The memory units A0, A1 and A2 included within the basic counter circuit may advantageously comprise multivibrator bistable devices which are adapted to be set or reset, respectively, in response to an input pulse appearing at the set terminal S or the reset terminal R, respectively. The employment of bistable multivibrator devices rather than binary counter circuits as memory units in the counter circuit of FIG. 1 avoids the requirement that the input pulse duration must not exceed the round trip propagation time of the feedback loop of each binary counter circuit. However, it is to be understood that binary counter circuits may be employed if the duration of the input pulse is accordingly controlled.

In accordance with an aspect of my invention, inputs are applied to these memory units alternately from input sources which, for the moment, may be considered to be the amplifiers 25 and 27; the derivation of these input pulses for the specific embodiment depicted is described in detail below. The first alternate pulses, herein designated the P1 pulses, are applied only to the lowest order memory unit A0, through a steering circuit, while the second alternate pulses, herein designated the P2 pulses, are applied to all other memory units through steering circuits.

In reflected binary code counter circuits, the memory unit of lowest order magnitude is adapted such that the count condition thereof is transferred by each alternate input pulse directed to the counter circuit. This is a distinguishing characteristic of reflected binary code counter ciruits and is illustrated in Table I, infra. Accordingly, the memory unit A0 of lowest order magnitude is connected to the output of the amplifier 27 from which are directed the P1 alternate input pulses, through a steering circuit comprising a group of AND gate circuits 29, 31, 33 and 35. The AND gates 29 and 31 are connected through the OR gate 37 to the set terminal S of the memory unit A0 while the AND gates 33 and 35 are connected to the reset terminal R thereof through the OR gate 39. Thus, each P1 pulse directed from the amplifier 27 is operative upon being directed through an enabled one of the AND gates 29, 31, 33 and 35 to either set or reset the memory unit A0. Similarly, the set terminal S and the reset terminal R of the memory unit A1 are connected to the output of the amplifier 25 through AND gates 41 and 43, respectively, and the set terminal S and the reset terminal R of the memory unit A2 are also connected thereto through the AND gates 45 and 47, respectively. More concisely, the P1 pulses directed to the steering circuit associated with the memory unit A0 of lowest order magnitude are only effective to transfer the count condition thereof. However, the P2 pulses directed to each of the AND gates comprising the steering circuits associated with each of the remaining memory units of the counter circuit are directable therethrough to transfer the count condition of one of the remaining memory units in a manner hereinafter to be described, as only one of such AND gates is enabled at any one time. Referring to Table I, infra, it is noted that the count condition of one of the remaining units, i.e., the memory units comprising the count circuit except that of lowest order magnitude, is transferred by alternate input pulses, i.e., the P2 pulses, to effect a reflected binary code counting operation for the counter circuit.

Each of the AND gates 29, 31, 33, 35, 41, 43, 45 and 47 is provided with three input terminals. As the operations of the illustrative embodiments of this invention are described in terms of Boolean operational functions, two of the three input terminals of each of the above-enumerated AND gates are hereinafter identified with respect to the indication signal applied thereto from the output terminals of the memory units A0, A1 and A2 to which each is connected. Each of the memory units A0, A1 and A2 is provided with an output terminal designated identically as the memory unit from which is provided an indication of a set or count condition therein and a second output terminal similarly identified but provided with a Boolean "not" designation from which is provided an indication of a reset or absence of count condition therein. For example, considering the AND gate 33, one input terminal of which is connected to the output of the amplifier 27, the remaining two input terminals are connected to the output terminal A1 of the memory unit A1 and to the output terminal $\overline{A2}$ of the memory unit A2 so as to be enabled according to the Boolean operational function P1 (A1$\overline{A2}$) as illustrated in Table I, infra. Accordingly, an indication of a count condition in the memory unit A1 is provided at the output terminal A1 thereof which is applied to one input terminal and an indication of the absence of a count condition in the memory unit A2 is provided at the output terminal $\overline{A2}$ which is applied to another input terminal of the AND gate 33. The AND gate 33, during a count position of the counter section wherein the memory unit A1 is set and the memory unit A2 is reset, is thereupon enabled by the appearance of a P1 pulse at the remaining input terminal thereof, the P1 pulse appearing through the OR gate 39 to the reset terminal R of the memory unit A0 to advance the count position of the first counter section. It is evident that the operation of the AND gate 33 is not affected by the count condition of the memory unit A0 which is tansferred by the P1 pulses directed therethrough but is solely controlled by the count conditions of the memory units A1 and A2. As is further hereinafter described, the operation of each of the remaining AND gates 29, 31, 35, 41, 43, 45 and 47 is similar in that the conditioning of each is not affected by the count condition of that memory unit to be transferred by the input pulse directed therethrough but is rather determined by the count conditions of the remaining memory units in the counter circuit.

To facilitate an understanding of the operation of the counter section now being described, the reflected binary code counting sequence thereof and the Boolean operational functions of the gating circuits associated therewith are set forth below.

*Table I*

| Pulse No. | Circuit inputs | | First counter section | | | Enabled AND gate | Boolean operational function |
|---|---|---|---|---|---|---|---|
| | P1 | P2 | A2 | A1 | A0 | | |
| 1 | 1 | 0 | 0 | 0 | 0 | 29 | P1 ($\overline{A1}\overline{A2}$+A1A2). |
| 2 | 0 | 1 | 0 | 0 | 1 | 41 | P2 (A0$\overline{A2}$). |
| 3 | 1 | 0 | 0 | 1 | 1 | 33 | P1 (A1$\overline{A2}$+$\overline{A1}$A2). |
| 4 | 0 | 1 | 0 | 1 | 0 | 45 | P2 ($\overline{A0}$A1). |
| 5 | 1 | 0 | 1 | 1 | 0 | 31 | P1 ($\overline{A1}\overline{A2}$+A1A2). |
| 6 | 0 | 1 | 1 | 1 | 1 | 43 | P2 (A0A2). |
| 7 | 1 | 0 | 1 | 0 | 1 | 35 | P1 (A1$\overline{A2}$+$\overline{A1}$A2). |
| 8 | 0 | 1 | 1 | 0 | 0 | 47 | P2 ($\overline{A0}\overline{A1}$). |

It is evident that during a count position of zero in the counter section of FIG. 1, only the AND gate 29 is conditioned as two of the three input terminals thereof are connected to the $\overline{A1}$ and $\overline{A2}$ terminals from which are provided indications of a reset condition in each of the memory units A1 and A2, respectively. The remaining AND gates 31, 33 and 35, also connected to the memory unit A0, are only conditioned when there is a count condition present in one or both of the memory units A1 and A2 as illustrated in Table I, supra. It is evident, therefore, that the conditioning of one of the AND gates 29, 31, 33 and 35 is determined not by the memory unit A0 to which each is connected but rather solely by the count condition of the remaining memory units in the first counter section, i.e., memory units A1 and A2. If during the time that the AND gate 29 is conditioned a P2 pulse is directed from the amplifier 25, neither of the memory units A1 nor A2 can be transferred thereby as such pulse would be inhibited as none of the Boolean operational functions peculiar to the AND gates 41, 43, 45 and 47 are satisfied. A P1 pulse directed from the amplifier 27 is applied simultaneously to an input terminal of each of the AND gates 29, 31, 33 and 35. During a count position of zero, only the AND gate 29 is enabled according to the function P1 ($\overline{A1}\overline{A2}$+A1A2) and a P1 pulse is directable through the AND gate 29 and the OR gate 27 to the set terminal S of the memory unit A0. The appearance of a P1 pulse at the set terminal S of the memory unit A0 through the AND gate 29 is operative to transfer the count condition thereof to provide a count position of one in the counter circuit of FIG. 1.

From the Boolean operational functions listed in Table I, the memory unit A1 is adapted to be set by a P2 pulse directed through the AND gate 41 according to the function P2 (A0$\overline{A2}$). During a count position of one in the counter circuit of FIG. 1, the memory unit A0 is in a set condition while the memory unit A2 is in a reset condition. Accordingly, the AND gate 41 is conditioned by the count conditions of the memory units A0 and A2 and a P2 pulse directed from the amplifier 25 satisfies the function P2 (A0$\overline{A2}$) to set the memory unit A1. The P2 pulse is at this time inhibited by the AND gates 43, 45 and 47 as none of the Boolean operational functions peculiar thereto is satisfied. As is now evident, the presence of a set condition in the memory unit A1 affects the conditioning of AND gate 33, i.e., the memory unit A1 is set and the memory unit A2 is in a reset condition whereby indications are provided to two of the input terminals of AND gate 33 from the output terminals A1 and $\overline{A2}$, and a next received P1 pulse is effective to reset the memory unit A0 according to the function P1 (A1$\overline{A2}$+$\overline{A1}$A2). This function is only satisfied upon the appearance of a P1 pulse to the previously fully conditioned AND gate 33, the conditioning of which is predicated upon the previous appearance of a P2 pulse to set the memory unit A1 whereby an indication is provided from the output terminal A1. Therefore, upon an input pulse, i.e., either a P1 or a P2 pulse, being directed through an enabled AND gate within the steering circuits associated with the counter section of FIG. 1 to transfer the count condition of a particular memory unit, a second AND gate therein is partially conditioned in response to such transfer. The second AND gate is fully conditioned by a remaining memory unit which is neither affected by the input pulse nor responsive to the second AND gate. Accordingly, there are two AND gates within the steering circuits associated with the counter circuit of FIG. 1 which are in a fully conditioned state prior to the reception of either a P1 or P2 pulse. For example, upon the setting of the memory unit A1 by the P2 pulse in the operation of the counter circuit so far described, the AND gate 41 remains conditioned as it is not affected by a transfer of a count condition of memory unit A1 while the AND gate 33 is fully conditioned by such transfer, the AND gate 33 being partially conditioned by the count condition of memory unit A2. While this is an apparent false state in the operation of the counter circuit, a false operation thereof is avoided as each of the two now conditioned AND gates, e.g., AND gates 33 and 41, is responsive to a different one of the two input pulses, i.e., a P1 pulse or a P2 pulse, respectively, directed thereto.

Accordingly, the appearance of a P2 pulse through the enabled AND gate 41 according to the function P2 ($A0\bar{A}2$) is operative to provide a count position of two in the first counter section, i.e., the memory units A0 and A1 are set and the memory unit A2 is still reset. A count position of two in the counter partially satisfies the Boolean function P1 ($A1\bar{A}2$) so that, upon the appearance of a subsequent P1 pulse, i.e., a third input pulse, directed from the output of the amplifier 27, the pulse is directed through the now enabled AND gate 33 and the OR gate 39 to the reset terminal R to reset the memory unit A0 according to the function P1 ($A1\bar{A}2+\bar{A}1A2$). In order for the memory unit A0 to be reset to provide a count position of three in the counter, a P2 pulse must of necessity have been previously directed through the AND gate 41 to provide a count condition for the memory unit A1 whereupon the AND gate 33 could be enabled by the appearance of a P1 pulse. It is evident, therefore, that the appearance of a pulse, i.e., either a P1 pulse or a P2 pulse, of prolonged duration or a series of such pulses from one of the amplifiers 27 and 25 which are directed through an enabled AND gate to the set terminal S or the reset terminal R of a memory unit in the counter circuit of FIG. 1 cannot affect an advance in the count position of the counter upon the count condition of such memory unit having been once transferred thereby until a pulse has been received from the other of the amplifiers 27 and 25 to priorly advance the count position.

In the operation of the counter circuit so far described, it is evident that the count condition of one, and only one, of the memory units A0, A1 and A2 is transferred by one of the P1 and P2 pulses to provide for the reflected binary code counting sequence. In addition, while two of the AND gates 29, 31, 33, 35, 41, 43, 45 and 47 can be fully conditioned at one time, only one of the two fully conditioned AND gates can be enabled at any one time as the P1 and the P2 pulses are alternately received in time sequence. It therefore follows that each of the above-enumerated AND gates is enabled in a definite sequence. As there is a single variable change per input pulse in the counter, input pulses appear at the outputs of each of the AND gates 29, 31, 33, 35, 41, 43, 45 and 47 singularly in a time sequence corresponding to the appearance of each of the P1 pulses and P2 pulses. Accordingly, the counter circuit being described may be effectively employed either as a delay-free counter circuit or adapted to function efficiently as a delay-free shift register by selectively connecting a desired device to be controlled to the outputs of the above-enumerated AND gates. The operation of the counter circuit as a delay-free shift register will be hereinafter more fully described with respect to the serial-to-parallel converter arrangement shown in FIG. 2 and the parallel-to-serial converter shown in FIG. 2A.

When a counter circuit in accordance with my invention is employed as a delay-free counter from which an output is to be obtained upon a count of a predetermined number of input pulses, additional memory units A3, A4 . . . AN may be provided to increase the count capacity of the counter section of FIG. 1. However, in accordance with another aspect of my invention, a considerable saving in logic gates and steering circuitry components may be attained by providing a number of distinct counter sections as depicted in FIG. 1 and by connecting them together such that each subsequent counter section receives its alternate input pulses from the prior counter section. Such an additional counter section is depicted in FIG. 4, the input pulses being provided thereto on the leads 69 and 71 connected to the outputs of the AND gates 45 and 47, respectively, of the highest order memory unit A2 of the circuit of FIG. 1, which may now be considered to be the first section of a counter circuit, as depicted in FIGS. 1 and 4 when arranged in accordance with the key diagram of FIG. 5B which comprises a pair of sections.

The appearance of a subsequent P1 pulse, i.e., the fourth input pulse, through the AND gate 33 and the resultant resetting of the memory unit A0 partially satisfies the function P2 ($\bar{A}0A1$) whereby the appearance of a next subsequent P2 pulse from the amplifier 25 is directed through the now enabled AND gate 45 to the set terminal S of the memory unit A2. The memory unit A2 advantageously provides the redundant function within the counter circuit comprising the memory units A0, A1 and A2 and B0, B1 and B2 of my invention. The memory unit A2 is termed redundant in that it does not serve to increase the count capacity of the counter circuit but is rather employed specifically for the purpose of simplifying the AND gates 29, 31, 33, 35, 41, 43, 45 and 47 associated with the first counter section and the corresponding AND gates 49, 51, 53, 55, 61, 63, 65 and 67, respectively, of the second counter section. The memory unit A2 is further employed to complete an independent operation for the first counter section whereby an advance of count position thereof is not dependent upon the count position of the second counter section.

It is evident that an AND gate circuit of the type illustrated in FIG. 1 is required for each count position of each counter section when all combinational states are used. Each AND gate would normally require one unilateral semiconductor diode device per input terminal, i.e., a semiconductor diode device for each of the memory units from which enabling indications are supplied and a semiconductor diode device to which are supplied the input pulses. In addition, as an OR gate is required wherever a set terminal S or a reset terminal R of a memory unit is connected to more than a single AND gate output, at least one unilateral semiconductor diode device per input terminal thereof is required. Accordingly, if all possible combinational states are utilized, the number of unilateral semiconductor diode devices required for a proper operation of the counter circuit now being described is given by the expression $$N_t=(n+1)2^n-4$$

where $n$ is equal to the number of memory units which comprise the counter circuit and where "4" is subtracted because the two highest order memory units do not require OR gates. The number of unilateral semiconductor diode devices required in counter circuits of large capacity becomes prohibitive. However, by providing for a redundant memory unit, i.e., memory unit A2, the counter circuit shown in FIGS. 1 and 4 is effectively divided into two distinct counter sections whereby the number of unilateral semiconductor diode devices required for a large capacity operation thereof is greatly reduced. The counter circuit, as shown, comprises a total of six memory units A0, A1 and A2, B0, B1 and B2 but is operative to effectively provide for a total count position of thirty-two. As is well known, a count position of thirty-two would normally require that five memory units be employed. However, memory unit A2, which corresponds to that unit of highest order magnitude in the first counter section is adapted to be set or reset concurrently with each transfer in count condition of one of the memory units in the next subsequent counter section, i.e., memory units B0, B1 and B2. Considering the manner in which the memory unit A2 is arranged within the first counter section and with respect to the second counter section, it is to be noted that the leads 69 and 71 are connected to the output of the AND gates 45 and 47, respectively, so that each of the P2 pulses directed through the AND gate 45 to set terminal S of the memory unit A2 according to the function P2 ($\bar{A}0A1$) is also multipled to one input of each of the AND gates 49, 51, 53 and 55 and each of the P2 pulses directed to the reset terminal R of the memory unit A2 through the AND gate 47 according to the function P2 ($\overline{A0}\,\overline{A1}$) is also multipled to one of the inputs of each of the AND gates 61, 63, 65 and 67. The appearance of a P2 pulse through the AND gate 45 and along the lead 69, hereinafter referred to as a P1′ pulse, corresponds to a count position of four of the first counter section. Similarly, by a continuation of the counting sequence as described above and depicted in Table I, supra, the appearance of a P2 pulse through the AND gate 47 and along the lead 71, hereinafter referred to as a P2′ pulse, corresponds to a count position of eight of the first counter section. Accordingly, the function of the memory unit A2 is to transfer information of the count position of the first counter section to the second counter section to provide for a tandem operation of these sections while providing an operation for the first counter section which is independent of the operation of the second counter section. The memory unit A2 can, in effect, be considered as a source of input pulses, i.e., P1′ and P2′ pulses, to the second counter section which are directed alternately and in time sequence along the leads 69 and 71 to correspond in occurrence to each second and fourth P2 pulse, respectively, directed to the first counter section.

To facilitate an understanding of the complete operation of the counter circuit and, more particularly, of the second counter section, the reflected binary code counter sequence of the second counter section and the Boolean operational functions of the gating circuits associated therewith are set forth below.

*Table II*

| Input pulse No. | Derived pulse | | Second counter section | | | Enabled AND gate | Boolean operational function |
|---|---|---|---|---|---|---|---|
| | P1′ | P2′ | B0 | B1 | B2 | | |
| 4 | 1 | 0 | 0 | 0 | 0 | 49 | P2 ($\overline{A0}$A1) ($\overline{B1}\,\overline{B2}$+B1B2). |
| 8 | 0 | 1 | 0 | 0 | 1 | 61 | P2 ($\overline{A0}\,\overline{A1}$) (B0$\overline{B2}$). |
| 12 | 1 | 0 | 0 | 1 | 1 | 53 | P2 ($\overline{A0}$A1) (B1$\overline{B2}$+$\overline{B1}$B2). |
| 16 | 0 | 1 | 0 | 1 | 0 | 65 | P2 ($\overline{A0}\,\overline{A1}$) ($\overline{B0}$B1). |
| 20 | 1 | 0 | 1 | 1 | 0 | 51 | P2 ($\overline{A0}$A1) ($\overline{B1}\,\overline{B2}$+B1B2). |
| 24 | 0 | 1 | 1 | 1 | 1 | 63 | P2 ($\overline{A0}\,\overline{A1}$) (B0B2). |
| 23 | 1 | 0 | 1 | 0 | 1 | 55 | P2 ($\overline{A0}$A1) (B1$\overline{B2}$+$\overline{B1}$B2). |
| 32 | 0 | 1 | 1 | 0 | 0 | 67 | P2 ($\overline{A0}\,\overline{A1}$) ($\overline{B0}\,\overline{B1}$). |

According to the Boolean operational functions set forth above, it is evident that the memory units B0, B1 and B2 comprising the second counter section can only be advanced upon the appearance of a P2 pulse and an enabling one of the AND gates 45 and 47 according to the function P2 ($\overline{A0}$A1) or P2 ($\overline{A0}\,\overline{A1}$), respectively.

Upon the appearance of a P2 pulse through the now enabled AND gate 45 to the set terminal S of the memory unit A2 according to the function P2 ($\overline{A0}$A1), a P1′ pulse appears concurrently along the lead 69. During the count the position of three in the first counter section, each of the memory units B0, B1 and B2 is in a reset condition. The AND gate 49 is enabled upon the appearance of a P1′ pulse along lead 69 according to the function P1′ ($\overline{B1}\,\overline{B2}$), such pulse being directed therethrough and through the OR gate 57 to the set terminal S of the memory unit B0. At a count position of four in the counter circuit, therefore, the memory units A2 and B0 are transferred to a count condition concurrently. As a functional requirement for a reflected binary code operation for a counter circuit is that a single variable change per input pulse be effected, the memory unit A2 may be disregarded when considering the count position of the counter circuit. The memory units A2 serves only to complete the counting operation of its respective counter section. This is evident as an enabling of the AND gates associated with each of the memory units A0 and A1 are conditioned according to the count condition of the memory unit A2 and are in no way affected by the count position of the second counter section. Similarly, the AND gates associated with the memory units B0, B1 and B2 are conditioned according to the count position of their respective counter section and are in no way affected by the count position of the first counter section. Therefore, the necessary number of unilateral semiconductor diode devices required for a large capacity count by a counter circuit provided with a redundant memory unit is effectively reduced according to the expression $$N_s=N_t-[((x+1)2^x-4)+((y+1)2^y-4)] \quad (1)$$

where $$(x+y)=(n+1) \quad (2)$$

where $x$ is equal to the total number of memory units in the first counter section; $y$ is equal to the total number of memory units in the second counter sections and $N_t$, as defined above, is equal to the total number of unilateral semiconductor diode devices necessary for a same large capacity count if a redundant memory unit is not employed within a counter circuit comprising a total number of $n$ memory units.

Upon a P1′ pulse having been derived and the memory unit B0 having been set, the counting sequence of the first counter section continues independently of the second counter section in accordance with Table I, supra. During a count position of four and upon the receipt of the next subsequent P1 pulse, the AND gate 31 is enabled according to the function of P1 ($\overline{A1}\,\overline{A2}$+A1A2) whereupon the memory unit A0 is again set through the OR gate 37 to provide a count condition of five in the first counter section. The AND gate 43 is thereupon enabled by a next subsequent P2 pulse and the memory unit A1 reset according to the function P2 (A0A2) and the next subsequent P1 pulse operating again to reset the memory unit A0 through the AND gate 35 and the OR gate 39 according to the function P1 (A1$\overline{A2}$+$\overline{A1}$A2). Accordingly, at the count position of seven, the memory units A0 and A1 are reset and the memory unit A2 is in a count condition. Upon the appearance of the next subsequent P2 pulse, i.e., the eighth input pulse, the AND gate 47 is enabled and the memory unit A2 reset according to the function P2 ($\overline{A0}\,\overline{A1}$) to complete a cyclic counting operation of the first counter section. The enabling of the AND gate 47 according to the function P2 ($\overline{A0}\,\overline{A1}$) results in a P2′ pulse being directed along the lead 71 to one input of each of the AND gates 61, 63, 65 and 67. Accordingly, the AND gates 45 and 47 as controlled by the count conditions of the memory units A0 and A1 may be considered as a source of input pulses to second counter section which appear alternately and in time sequence upon the leads 69 and 71.

The counting sequence of operation of the second counter section has been set forth in Table II, supra, and an appreciation of the fact that the second counter section is stepped according to the Boolean operational functions also set forth therein makes evident that the AND gate 67 is enabled and the memory unit B2 reset to normalize the counter circuit according to the function P2 ($\overline{A0}\,\overline{A1}$) ($\overline{B0}\,\overline{B1}$) on the sixteenth P2 pulse directed from the amplifier 27. Accordingly, an output derived from the AND gate 67 corresponds to a count position of thirty-two for the counter circuit or the completion of four cyclic operations of the first counter section. In the specific embodiment depicted in FIGS. 1 and 4 the output of the AND gate 67 is directed to an indication device ID and the reception of an indication thereat is indicative of four completed cyclic operations of the first counter section. It is evident that the second counter section may comprise a greater number of memory units than three to provide an indication for a greater number of cyclic operations of the first counter section. Further additional counter sections, similar to that depicted in FIG. 4, may be employed, each additional counter section receiving its alternate input pulses from a redundant stage or memory unit of the next lower ordered counting section.

Figure 2:
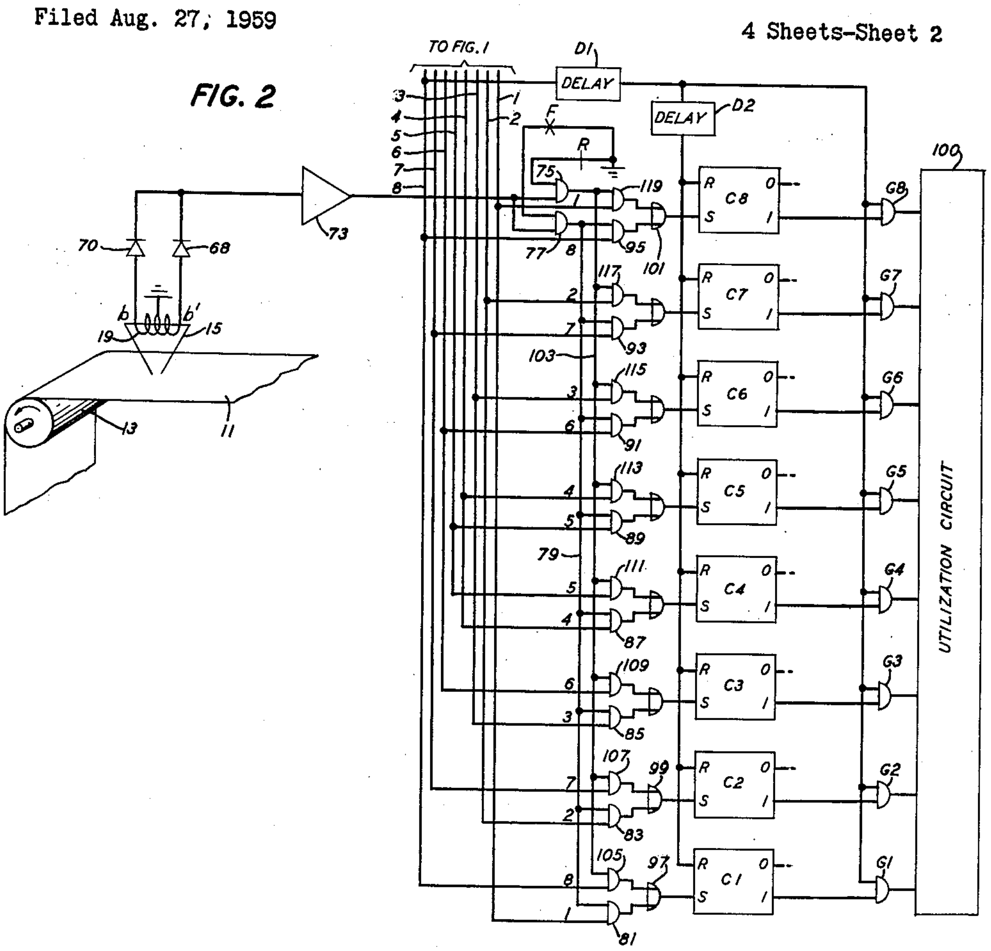
FIG. 2 is a schematic block representation of a serial-to-parallel converter circuit which is adapted, when arranged in accordance with the key diagram of FIG. 5, to be controlled by the counter circuit of FIG. 1.
Figure 2A:
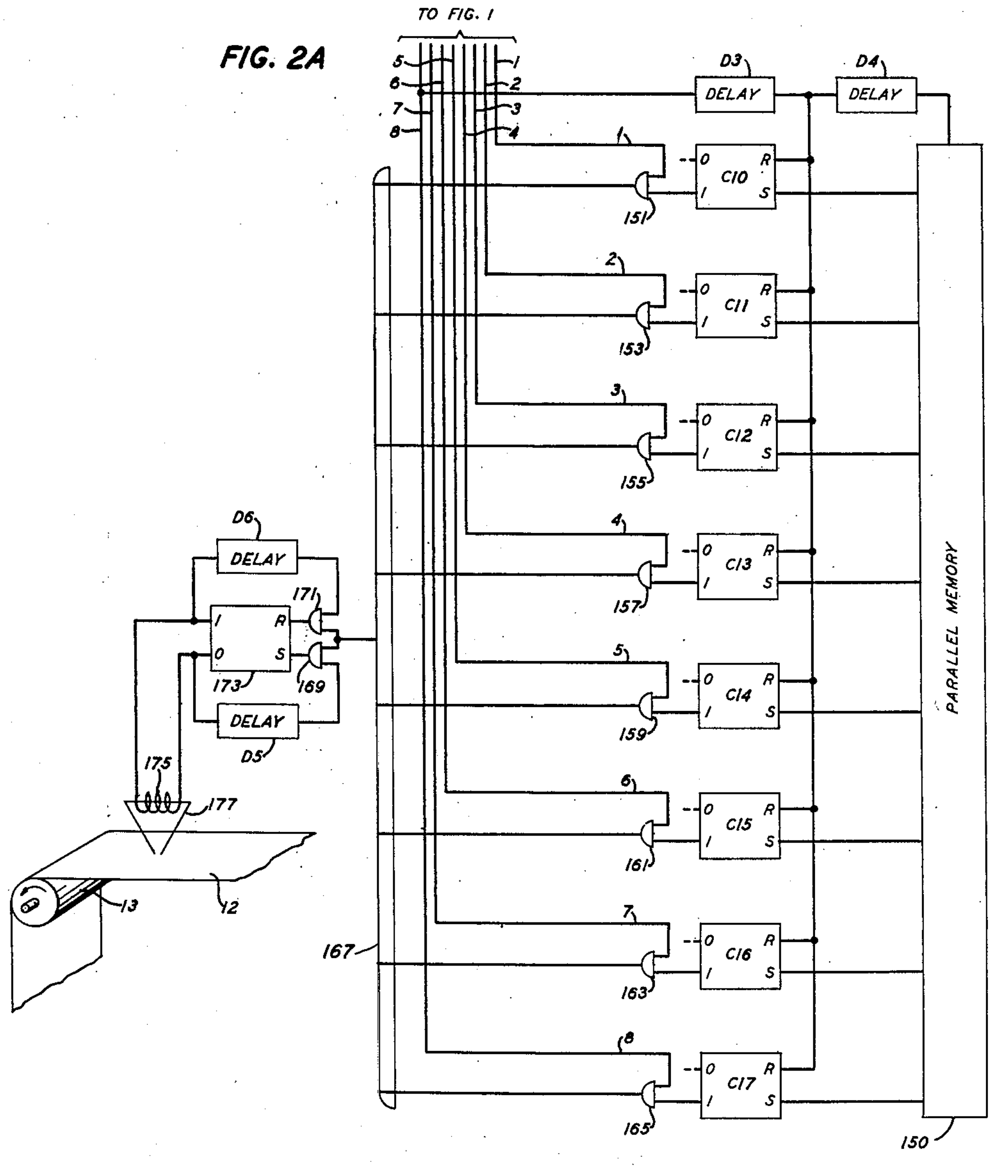
FIG. 2A is a schematic block representation of a parallel-to-serial converter circuit which is adapted, when arranged in accordance with the key diagram of FIG. 5A, to be controlled by the counter circuit of FIG. 1.

Having now discussed my basic counter circuit, as depicted in FIG. 1, and the specific embodiment thereof employing multiple counting sections and redundant memory stages to attain a large magnitude delay free counting circuit with a large saving in component logic elements, it may be advantageous to describe the specific arrangement disclosed for obtaining the input pulses P1 and P2 before going on to describe additional embodiments of my invention wherein the basic counter circuit of FIG. 1 is employed as a delay free shift register to provide output signals successively on individual leads for utilization by additional circuitry, as depicted in FIGS. 2 and 2A.

Referring now again to FIG. 1, there is shown a magnetic tape on which are recorded clock pulses, as shown in FIG. 3(*c*), from which are derived the input pulses P1 and P2 to step the counter circuit. These clock pulses, by definition, are regularly occurring and each is indicated by a longitudinal change in the magnetic density, either positive or negative, of a portion of the magnetic tape 10.

In the embodiment of my invention including FIGS. 1 and 2, a second magnetic tape 11, shown in FIG. 2, is provided to record the information bits comprising each binary word from which are derived the information pulses shown in FIG. 3(*e*) which are to be serially directed to the converter circuit of FIG. 2. The information bits are recorded on a nonreturn-to-zero basis as shown in FIG. 3(*b*) whereby each information bit is indicated by a longitudinal change, either positive or negative, in the magnetic density. The absence of an information bit is, therefore, indicated by the longitudinal continuity of the magnetic density at that portion of the magnetic tape 11 corresponding to the location of an information bit slot in the binary word. The mechanism for transporting the magnetic tapes 10 and 11 is shown as a common drive capstan 13 which is illustrated as rotatable in a counterclockwise direction. It is, however, to be understood that the drive capstan 13 may also be rotatable in a clockwise direction whereby the direction of travel of the magnetic tapes 10 and 11 may be reversed. Accordingly, the information bits comprising each binary word recorded on the magnetic tape 11 may be read in either a forward or reverse direction. However, the information pulses derived from the recorded information bits are distributable within the converter arrangement of FIG. 2 in a manner to be hereinafter described so as to be stored in a particular one of the storage devices C1 through C8 corresponding, respectively, to each information bit slot within the binary word.

Reading heads 17 and 15 are associated with the magnetic tapes 10 and 11, respectively, and are adapted to sense concurrently the information recorded in each in a manner well known in the art. The reading heads 15 and 17 are each provided with reading coils 19 and 20, respectively, the center taps of each being connected to ground. The operation of the reading heads 15 and 17 and their associated reading coils 19 and 20, respectively, may be more easily understood by reference to the curves of FIG. 3(*c*), FIG. 3(*d*) and FIG. 3(*e*). As is well known in the art, a constant magnetic density along a longitudinal portion of the magnetic tape 11 and 10 passing beneath the reading heads 15 and 17, respectively, is not productive of an induced current through the associated reading coils 19 and 20, respectively. However, a magnetic density discontinuity on either of the magnetic tapes 11 and 10, is sensed by the reading heads 15 and 17, respectively, whereby a current is induced in the associated reading coils 19 and 20, respectively, due to a change in the magnetic flux passing therethrough as concentrated by the associated reading head. The direction of the magnetic flux passing through the reading coils 19 and 20 is determinative of the direction of induced current flow therein.

Referring specifically to the reading head 17 which is arranged to read the clock pulses recorded on the magnetic tape 10 as illustrated in FIG. 3(*a*), a positive magnetic density discontinuity, i.e., an increase in the magnetic density of a portion of the magnetic tape 10, appearing beneath the reading head 17 induces a current flow through the reading coil 20 such that the *a'* terminal is positive with respect to the *a* terminal thereof. Upon the positive magnetic discontinuity having passed beneath the reading head 17, the magnetic density thereof remains constant so that the induced current through the reading coil 20 decays. A similar effect is produced by the passage of a negative magnetic density discontinuity, i.e., a decrease in the magnetic density of a portion of the magnetic tape 11, beneath the reading head 17 except for the fact that the current is induced in the reading coil 20 in a reverse direction whereby the *a* terminal is positive with respect to the *a'* terminal thereof. It is evident that the regularly occurring magnetic density discontinuities appearing on magnetic tape 10 and sensed by the reading head 17 are productive of alternately occurring positive pulses at the *a* and *a'* terminals of the reading coil 20. As is well known, the production of a positive pulse at one of the terminals of a reading coil having the center tap thereof grounded occurs simultaneously with the production of a negative pulse at the opposite terminal thereof. The function of the unilateral semiconductor devices 21 and 23 which are connected at the anodes thereof to the *a* and *a'* terminals now becomes evident. As the counter circuit of FIG. 1 is adapted to be stepped by positive pulses, the diodes 21 and 23 are operative to provide that only positive pulses developed at the *a* and *a'* terminals of the reading coil 20 be directed therethrough to the amplifier devices 25 and 27, respectively, while inhibiting the passage of negative pulses. However, if negative pulses are chosen to operate the counter circuit of FIG. 1, the polarity of the diode devices 21 and 23 may be reversed with respect to the *a* and *a'* terminals of the reading head 17 to allow for a passage of negative pulses only while inhibiting the passage of positive pulses.

The arrangement so far described illustrates the manner in which a train of serially arranged input pulses which alternately appear on a pair of input leads may be developed for stepping the counter circuit of FIG. 1. The output of the amplifier 27 is depicted in FIG. 3(*c*) as a series of positive pulses occurring upon a sensing of each positive magnetic density discontinuity by the reading head 17 and are the P1 pulses. The output of the amplifier 25 is depicted in FIG. 3(*d*) as a series of positive pulses occurring upon a sensing of each negative magnetic density discontinuity by the reading head 17 and are the P2 pulses.

As mentioned above, the steering circuits comprising the AND gate circuits 29, 31, 33, 35, 41, 43, 45 and 47 associated with the first counter section may be employed as a steering circuit to selectively redirect input pulses directed thereto in a predetermined time sequence to step the serial-to-parallel converter circuit arrangement shown in FIG. 2 or the parallel-to-serial converter shown in FIG. 2A when arranged in accordance with the key diagrams of FIGS. 5 and 5A, respectively. Such employment is possible as one, and only one, of the above-enumerated AND gate circuits is enabled at one time.

The serial-to-parallel converter of FIG. 2 comprises the storage devices C1 through C8 which correspond, respectively, to particular information bit slots within each of a group of binary words which have been serially recorded on magnetic tape 11. The steering circuits associated with the first counter section are operative to selectively enable successive ones of the steering circuits individually associated with each of the storage devices C1 through C8 at a time when the information bit slot being sensed by the reading head 15 corresponds to the associated storage device. The clock pulses recorded on the magnetic tape 10 as sensed by the reading head 17 provide an identification of the position of each information bit slot in a binary word being sensed by the reading head 15. As the information bits comprising each binary word have been recorded on the magnetic tape 11 on a nonreturn-to-zero basis, either a positive or a negative magnetic density discontinuity within a particular information bit slot is indicative of the presence of an information bit or a binary "1" while a continuous degreee of magnetization is indicative of an absence of an information bit or a binary "0." A sensing by the reading head 15 of a portion of the magnetic tape 11 corresponding to a particular information bit slot is effective to produce current flow in the reading coil 19 such that a positive potential is present at terminal *b'* thereof upon each positive magnetic density discontinuity and at the terminal *b* thereof upon each negative magnetic density discontinuity. The unilateral semiconductor devices 68 and 70 are connected to the terminals *b'* and *b*, respectively of the reading coil 19 to inhibit the passage of negative pulses developed thereat. The reading head 15 and the reading coil 19 associated therewith in combination with the unilateral semiconductor devices 68 and 70 are productive of positive information pulses which are directed to the input of the amplifier 73 upon a magnetic density discontinuity being sensed by the reading head 15. The output of the amplifier 73 is graphically illustrated in FIG. 3(*e*). It is to be noted that a positive information pulse corresponds in time to each magnetic density discontinuity sensed by the reading coil 19 on the magnetic tape 11 as illustrated in FIG. 3(*b*).

The output of the amplifier 73 is connected to one input of each of the AND gates 75 and 77. The other input of each of the AND gates 75 and 77 is connected to a single transfer switch which is shown as the contact devices R and F and which is operative to provide a ground-enabling potential to condition one of the AND gates 75 or 77. The lead 79 is multipled to the steering circuit comprising that an information bit recorded on the magnetic tape 11 in a particular information bit slot may be read bidirectionally by the reading head 15 and the information pulses developed therefrom may be stored in the serial-to-parallel converter arrangement in that one of the storage devices C1 through C8 corresponds thereto. The contact member F is shown as open so that a series of information pulses appearing at the output of the amplifier 73 is directed through the AND gate 77 and along the lead 79. The lead 79 is multiplied to the steering circuit comprising a plurality of AND gates 81, 83, 85, 87, 89, 91, 93 and 95 associated one with each of the storage devices C1 through C8, respectively. The other input of the AND gates 81, 83, 85, 87, 89, 91, 93 and 95 are selectively connected to the outputs of the AND gates 29, 41, 43, 45, 31, 43, 35 and 47, respectively which have been described above as being successively enabled in turn by each P1 pulse and P2 pulse directed to the first counter section. The connections thus provided are effective to condition the AND gates 81 83, 85, 87, 89, 91, 93 and 95 successively in turn upon each appearance of a P1 pulse or P2 pulse to the first counter section. Accordingly, an information bit i.e. a binary "1" stored in a particular information bit slot on the magnetic tape B and read concurrently as a clock pulse stored on the magnetic tape 10 from which is developed either a P1 pulse or a P2 pulse is directed to that one of the storage devices C1 through C8 corresponding to the particular slot. For example, at the time T0 as shown in FIG. 3, a P1 pulse, FIG. 3(*c*), is directed through the AND gate 29 and the OR gate 37 to the set terminal S of the memory unit A0, according to the function P1 ($\overline{A1A2}$), whereupon the AND gate 41 is conditioned, according to to the partially satisfied function P2 ($A1\overline{A2}$). Also connected to the output of the AND gate 29 is one input terminal of the AND gate 81. Concurrently with the development of the P1 pulse, the reading head 15 senses a positive magnetic density discontinuity indicative of a binary "1" in that portion of the magnetic tape 11 corresponding to the first information bit slot in a binary word and a positive information pulse is directed through the diode 68, amplifier 73 and the enabled AND gate 77 to the second input terminal of the AND gate 81, the latter being enabled according to the function P1 ($\overline{A1A2}$) ($FI_p$), where F signifies the appearance of a ground-enabling potential through the contact device F and $I_p$ denotes the appearance of an information pulse from the amplifier 73. An enabling of the AND gate 81 results in the information pulse, shown in FIG. 3(*e*) as occurring at the time T0, being directed therethrough and through the OR gate 97 to the set terminal S of the storage device C1. The setting of the storage device C1 indicates that a binary "1" is present in the first information bit slot of the eight-bit binary word being directed to the serial-to-parallel converter arrangement. Storage devices C1 through C8 may each advantageously comprise a multivibrator bistable device provided with a set terminal S and a reset terminal R whereby a transfer of the operating condition thereof which will remain until retransferred by external influences. Accordingly, the storage device C1 remains set upon the application of such information pulse to the set terminal S thereof.

At the time T1, a magnetic density discontinuity is not present on the magnetic tape 11 to indicate the presence of a binary "0" or the absence of an information bit in the particular information bit slot being sensed. However, a negative magnetic density discontinuity appears on the magnetic tape 10 at the T1 which is sensed by the reading head 17 and a P2 pulse is developed as described above. The P2 pulse thus developed is effective to enable the AND gate 41 according to the function P2 ($A0\overline{A2}$) and transfer the count condition of the memory unit A1. The memory unit A1 is thereupon set to provide a count condition therein whereupon the AND gate 33 is conditioned, according to the partially satisfied function P1 ($A1\overline{A2}$), prior to the reception of a second P1 pulse from the amplifier 27. However, as the output of the AND gate 41 is connected to one input terminal of the AND gate 83, the AND gate 83 is conditioned during that time in which a P2 pulse is present and the first counter section is provided with a count position of two. Accordingly, an information bit if present in the second information bit slot of the binary word as recorded on the magnetic tape 11 would have been directed therethrough and through the OR gate 99 to set the storage device C2 according to the function P2 ($A0\overline{A2}$) ($FI_p$). Accordingly, the presence of a binary "0" or the absence of an information bit in a particular information bit slot of the binary word results in the storage devices C1 through C8 corresponding to such slot remaining in a reset position. This sequence of operation continues and, as one input of each of the AND gates multipled to the lead 79 is connected to the output of one of the AND gates 29, 31, 33, 35, 41, 43, 45, and 47, each one of the multipled AND gates 81, 83, 85, 87, 89, 91, 93 and 95 is successively conditioned in turn at a time corresponding to the individual information bit slots of the eight-bit binary word stored on the magnetic tape B. It is, therefore, obvious that upon a completion of a count position of eight by the first counter section, each of the AND gates 81, 83, 85, 87, 89, 91, 93 and 95 has been conditioned in turn and the storage devices C1 through C8, respectively, set if an information bit or a binary "1" is present in the information bit slot of the binary word corresponding thereto.

A setting of each of the storage devices C1 through C8 provides an indication at an output terminal thereof which is directed to one input of the AND gate circuits G1 through G8, respectively. Accordingly, particular ones of the AND gates G1 through G8 corresponding to each information bit slot contained in the binary word serially recorded on the magnetic tape 11 are conditioned due to the selective setting of the storage devices C1 through C8. The other input terminal of each of the AND gates G1 through G8 is connected through a delay network D1 to the output of the AND gate 47 associated with the first counter section from which is derived the P2′ pulse. Accordingly, upon the eighth information bit slot in each binary word recorded on the magnetic tape 11 having been sensed by the reading head 15 and a P2 pulse derived from the associated clock pulse directed to enable the AND gate 47 according to the function P2 ($\overline{A0A1}$), the AND gate 95 associated with the storage device C8 is conditioned in turn due to the connection of one input terminal thereof to the output terminal of the AND gate 47. An information bit if present in the eighth information bit slot in the binary word being sensed is directed from the amplifier 73 through the conditioned AND gates 77 and 95 and the OR gate 101 to the set terminal S of the storage device C8. The enabling of the AND gate 47, as described above, provides a P2′ pulse which is, in addition to being directed to the second counter section, directed through the delay network D1 to enable those AND gates G1 through G8 which have been conditioned by selectively operated ones of the storage devices C1 through C8, respectively. The delay provided by the delay network D1 to the P2′ pulse directed to the group of AND gates G1 through G8 is of sufficient duration to insure that the storage device C8 is set prior to the simultaneous enabling of the gating circuits G1 through G8 thereby. Accordingly, upon the passage of a P2′ pulse through the delay network D1, the storage devices C1 through C8 are sampled and the binary word stored therein parallelly directed to the utilization circuit 100.

Also connected to the output of the delay network D1 is the delay network D2 which is multipled to the reset terminals R of the storage devices C1 through C8. Upon the binary word having been directed to the utilization circuit 100 through the AND gates G1 through G8, the P2′ pulse which has been directed through the delay network D1 is further delayed by the delay network D2 and applied simultaneously to the reset terminal R of each of the storage devices C1 through C8 to normalize the serial-to-parallel converter arrangement. The delay network D2 provides sufficient delay to the P2′ pulse such that storage devices C1 through C8 are reset subsequent to the enabling of the gating circuits G1 through G8. However, the combined delay afforded by the delay networks D1 and D2 that the storage devices C1 through C8 are reset prior to the P1 pulse next subsequent to the P2 pulse from which the P2′ pulse was derived. Accordingly, the information bits stored in the storage devices C1 through C8 are parallelly directed through the AND gates G1 through G8, respectively, to the utilization circuit 100 and the storage devices normalized between each cyclic operation of the first counter section.

If the rotation of the common drive capstan 13 is reversed, it is evident that the reading head 15 would be operative to sense the information bit slots contained in the binary words recorded on the magnetic tape 11 in a reverse direction. It is evident that the clock pulses recorded on channel 10, as they are regularly occurring, may be sensed bidirectionally by the reading head 15. To allow for a bidirectional sensing of the information bit slots contained in the binary words recorded on the magnetic tape 11 and the utilization of the same storage devices C1 through C8 to record such information, the contact device R is open and the contact device F closed. Upon closing of contact device R, the AND gate 75 is now conditioned to be enabled upon the receipt of each information pulse from the amplifier 73. The opening of the contact device F inhibits the operation of the AND gate 77. The output of the amplifier 73, rather than being directed along the lead 79, is now directed through the AND gate 75 along the lead 103. The lead 103 is multipled to one input terminal of each of the AND gates 105, 107, 109, 111, 113, 115, 117 and 119, the output of each AND gate being connected through OR gates to the set terminal S of the storage devices C1 through C8, respectively. The other input terminal of each of the AND gates 105, 107, 109, 111, 113, 115, 117 and 119 are selectively connected to the outputs of the AND gates 47, 35, 43, 31, 45, 33, 41 and 29, respectively. The AND gates 105, 107, 109, 111, 113, 115, 117, and 119 are thereby conditioned successively in time sequence but in a reverse order as were the corresponding AND gates 81, 83, 85, 87, 89, 91, 93 and 95. Accordingly, with the contact device R closed and the contact device F opened, the information bit slots contained in each binary word as recorded on magnetic tape 11 are sensed in a reverse order by the reading head 15 but the information pulses derived from each is directed to that one of the storage devices C1 through C8 corresponding to the particular slot being sensed. Upon the binary word having been stored in the storage devices C1 through C8, the storage devices C1 through C8 are parallelly sampled and the serial-to-parallel converter arrangement normalized upon the development of the P2′ at the output of the AND gate 47 as hereinabove described.

The parallel-to-serial converter shown in FIG. 2A may be similarly adapted to be controlled by the AND gates 29, 31, 33, 35, 41, 43, 45 and 47 which comprise the steering circuits associated with the first counter section shown in FIG. 1. The parallel-to-serial converter of FIG. 2A advantageously comprises the storage devices C10, C11, C12, C13, C14, C15, C16 and C17 which correspond, respectively, to particular information bit slots within an eight-bit binary word which is parallelly directed from the parallel memory circuit 150. While the parallel memory circuit 150 is shown in block representation, it serves to illustrate that general class of equipment from which a plurality of information bits comprising a binary word may be parallelly directed. The parallel memory circuit 150 is multipled to the set terminal S of each of the storage devices C10 through C17. Upon a binary word having been directed from the parallel memory 150, selected ones of the storage devices C10 through C17 are set to indicate the presence of a binary "1" in the information bit slot within a binary word to which each of the storage devices corresponds, respectively. It is evident that each of the storage devices C10 through C17 in a reset condition indicates the presence of a binary "0" in the information bit slot within the binary word to which it corresponds.

The setting of a particular one of the storage devices C10 through C17 is operative to provide an indication from the single output thereof to one input terminal of the gating circuits 151, 153, 155, 157, 159, 161, 163 and 165, respectively, the other input terminal of each of the gating circuits being selectively connected to the outputs of the AND gates 29, 41, 33, 45, 31, 43, 35 and 47, respectively, which are shown in FIG. 1. The connections between the other input terminal of each of the gating circuits 151, 153, 155, 157, 159, 161, 163 and 165 connected to the output terminals of the AND gates 29, 41, 33, 45, 31, 43, 35 and 47, respectively, are provided with the reference characters 1, 2, 3, 4, 5, 6, 7 and 8, respectively, which indicate the sequence of enablement of the AND gates. The output terminals of the gating circuits 151, 153, 155, 157, 159, 161, 163 and 165 are multipled to the input of OR gate 167, the single output terminal of which is connected to one input terminal of each of the AND gates 169 and 171. Each of the AND gates 169 and 171 is selectively controlled by the operational state of the bistable device 173 to which it is connected. The output of the AND gate 169 is connected to the set terminal S of the bistable device 173 while the output of the AND gate 171 is connected to the reset terminal R thereof. The AND gates 169 and 171 are selectively conditioned by providing a feedback path from the pair of output terminals of the bistable device 173 through delay networks D5 and D6 so that the former is conditioned during a reset condition and the latter is conditioned during a set condition thereof. Accordingly, the operational state of the bistable device 173 is transferred upon each appearance of a pulse indication from the output of the OR gate 167 which indicates the storage of a binary "1" in that one of the storage devices C10 through C17 being sampled.

Each of the outputs of the bistable device 173 is connected to one of the terminals of the recording coil 175 such that there is a constant magnetic flux developed axially through the recording coil 175 which is responsive to be reversed upon each change in the operational state of the bistable device 173. This magnetic flux thus developed is concentrated by the recording head 177 which is associated with the recording coil 175 such that the portion of magnetic tape 12 passing therebeneath is affected by the magnetic flux passing through the air gap contained therein. As the direction of current flow through the recording coil 175 remains constant between successive pulse indications directed through the OR gate 167, a longitudinally continuous magnetization density is provided to that portion of the magnetic tape 12 passing beneath the recording head 177 during such time. The manner in which information is recorded on the magnetic tape 12 is illustrated in the curve of FIG. 3(*b*).

A magnetic density discontinuity, either positive or negative, is provided upon each appearance of a pulse indication through the OR gate 167 to transfer the operational state of the bistable device 173. Accordingly, upon a sampling of one of the storage devices C10 through C17 in which a binary "1" has been stored, a pulse indication is directed through the particular one of the AND gates 151, 153, 155, 157, 159, 161, 163 and 165 associated therewith, through the OR gate 167 and the conditioned one of AND gates 169 and 171 to transfer the operational state of the bistable device 173, as described above. The sampling of a particular one of a storage device C10 through C17 in which information bit has not been stored, which is representative of a binary "0," the operational state of the bistable device 173 is not transferred so that the recording head 177 and an associated recording coil 175 provide for the recording constant magnetic density on that portion of the magnetic tape 12 passing therebeneath. Therefore, the information bits which are parallelly stored in the storage devices C10 through C17 are serially directed through the OR gate 167 to selectively operate the bistable device 173 whereby representations indicative of the binary word directed from the parallel memory 150 is serially recorded on the magnetic tape 12.

A delay device D3 is multipled to the reset terminal R of each of the storage devices C10 through C17 and connected to the output of the AND gate 47, shown in FIG. 1. The pulse from the AND gate 47, i.e., the P2' pulse described above, is concurrently directed to the AND gate 165 to sample the storage state of the storage device C17 and to the input of the delay device D3, the output of which is multipled to the reset terminals R of the storage devices C10 through C17. Sufficient delay is provided by the delay network D3 to the pulse directed thereto from the AND gate 47 to insure a sampling of the storage device C17 thereby prior to such pulse being directed to the reset terminals R of the storage devices C10 through C17 whereby the parallel-to-serial converter shown in FIG. 2A is normalized. The output of the delay device D3 is also connected through an additional delay device D4 to the parallel memory 150 which is responsive to each pulse delayed thereby to initiate a next subsequent reading-in operation of the next binary word to the storage devices C10 through C17, as above described. The combined delay provided to each pulse directed from the AND gate 47 by the delay devices D3 and D4 is such that the storage devices C10 through C17 are reset and the parallel memory operated to parallelly direct a next binary word to the storage devices C10 through C17 prior to the P1 pulse next subsequent to the P2 pulse from which the P2' pulse was derived. Accordingly, the information bits comprising the next binary word parallelly stored in the storage devices C10 through C17, respectively, which are serially sampled through the successive enabling of the AND gates 151, 153, 155, 157, 159, 161, 163 and 165, respectively, and are stored serially on the magnetic tape through the agency of the bistable device 173, the recording head 177 and associated recording coil 175 as hereabove described.

It is to be understood that the above-described arrangements are merely illustrative of the principles of the invention. Numerous other arrangements may be devised by those skilled in the art without departing from the spirit and scope of the invention.

What is claimed is:

1. In a binary information converter, a plurality of output directing leads, circuit means for sequentially activating said plurality of output leads, said circuit means comprising a plurality of bistable circuit means each of which includes reset and set input terminals and two output terminals representative of each of the two possible stable states contained therein, a plurality of steering circuit means in one to one correspondence with said plurality of bistable circuit means, two input pulse directing leads, a source of input pulses which alternately activates each of said input leads, each of said plurality of steering circuit means including an AND logic gate whose output is connected to the set terminal of one of said plurality of bistable circuit means, and another AND gate whose output is connected to the reset terminal of the same one of said plurality of bistable circuit means, each of said AND gates being responsive to the simultaneous reception of a signal from one of the two output terminals of each of the nonconnected ones of said plurality of bistable circuit means and a signal from one of said two alternately activated input pulse directing leads to generate an output, said output directing leads being connected to each of said AND gates such that each lead is sequentially activated, a different one of said output directing leads being activated for each occurrence of an input pulse, all of said leads being activated before any one of said output directing leads may be reactivated.

2. In combination in a binary information converter, a reflected binary coded counter comprising a first plurality of steering circuit means and a first plurality of bistable circuit means in one to one correspondence and responsive thereto by changing states upon each occurrence of an output pulse therefrom, two input pulse directing leads, a source of input pulses which alternately activates each of said input leads, each of said steering circuit means including a plurality of AND logic gates each of which derives its input signals both from all of said bistable circuit means except that one which is responsive to the steering circuit means containing the AND gate, and also from one of said two alternately activated input pulse directing leads, said counter circuit further comprising a plurality of output directing leads in one to one correspondence with said AND logic gates and responsive to the switching of the corresponding AND gate by generating an output signal on the respective one of said output directing leads, only one of said AND gates being switched at any one time, and all the AND gates being switched once before any one of said output directing leads may be re-energized.

3. In a parallel-to-series converter, a combination as in claim 2 further comprising a second plurality of steering circuit means and a second plurality of bistable circuit means, each of said second plurality of steering circuit means being responsive to the simultaneous reception of signal pulses from the associated one of said second plurality of bistable circuit means and a different one of said output directing leads by generating an output signal, and means responsive to the output signals of any of said second plurality of steering circuit means by serially storing said output signals.

4. A combination as in claim 3 still further comprising a parallel memory which simultaneously activates each of said second plurality of bistable circuit means, and where said means responsive to the outputs of any of said second plurality of steering circuit means comprises an OR logic gate, and also means for serially storing the information received from the output of said OR logic gate.

5. In combination in a parallel-to-series converter, a first and second plurality of bistable circuit means, a first and second plurality of steering circuit means, a plurality of output directing leads in one to one correspondence with said second plurality of steering circuit means, two input pulse directing leads, a source of input pulses which alternately activates each of said input leads, said first plurality of bistable circuit means responsive to the corresponding ones of said first plurality of steering circuit means by switching stable states upon the reception of a single pulse therefrom, each of said first steering circuit means including a plurality of AND logic gates each deriving input signals both from all of said first plurality of bistable circuit means except that one which is responsive to the steering circuit means containing the AND gate, and from one of said two alternately activated input pulse directing leads, said plurality of output pulse directing leads connecting an input of one of said second steering circuit means and the output of one of said plurality of AND logic gates, said second steering circuit means being responsive to the simultaneous reception of a signal from both the associated one of said output directing leads and said associated second plurality of bistable circuits by generating an output signal, and means responsive to the output signals of any of said second plurality of steering circuit means by serially storing said output signals.

References Cited in the file of this patent

UNITED STATES PATENTS

| | | |
|---|---|---|
| 2,698,382 | Uglow | Dec. 28, 1954 |
| 2,767,908 | Thomas | Oct. 23, 1956 |
| 2,811,713 | Spencer | Oct. 29, 1957 |
| 2,816,223 | Nelson | Dec. 10, 1957 |
| 2,840,705 | Scully | June 24, 1958 |
| 2,888,556 | Richards | May 26, 1959 |

OTHER REFERENCES

"A Gray Code Counter," by Fischman, from IRE Transactions on Electrical Computers, June 1957, p. 120.

IBM Technical Disclosure Bulletin, vol. 1, No. 2, August 1958.